United States Patent
King et al.

(10) Patent No.: US 8,253,990 B2
(45) Date of Patent: Aug. 28, 2012

(54) SYSTEM AND METHOD FOR DEMARCATING MEDIA SHEETS DURING A SCAN OPERATION

(75) Inventors: Anthony Michael King, Lexington, KY (US); Mark E. Miller, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 514 days.

(21) Appl. No.: 12/540,763

(22) Filed: Aug. 13, 2009

(65) Prior Publication Data
US 2011/0038017 A1    Feb. 17, 2011

(51) Int. Cl.
*H04N 1/04* (2006.01)

(52) U.S. Cl. ........ 358/474; 358/451; 358/449; 358/496; 399/379

(58) Field of Classification Search .......... 358/474, 358/496, 497, 486, 501; 399/379
See application file for complete search history.

(56) References Cited

U.S. PATENT DOCUMENTS

| | | | | |
|---|---|---|---|---|
| 5,134,666 A | * | 7/1992 | Imao et al. | 382/164 |
| 5,390,029 A | * | 2/1995 | Williams et al. | 358/448 |
| 5,693,933 A | * | 12/1997 | Takasu et al. | 250/208.1 |
| 5,719,958 A | * | 2/1998 | Wober et al. | 382/199 |
| 6,198,088 B1 | * | 3/2001 | Seachman | 250/208.1 |
| 6,608,707 B1 | * | 8/2003 | Han | 358/497 |
| 6,930,809 B1 | * | 8/2005 | Kagawa et al. | 358/518 |
| 7,006,260 B2 | * | 2/2006 | Sato et al. | 358/448 |
| 7,548,356 B2 | * | 6/2009 | Han et al. | 358/497 |
| 7,648,138 B2 | * | 1/2010 | Hayashi et al. | 271/227 |
| 7,653,264 B2 | * | 1/2010 | Hero et al. | 382/294 |
| 7,684,916 B2 | * | 3/2010 | Wei et al. | 701/50 |
| 8,035,865 B2 | * | 10/2011 | Ishido et al. | 358/449 |
| 2002/0075529 A1 | * | 6/2002 | Sato et al. | 358/505 |
| 2003/0184820 A1 | * | 10/2003 | Han et al. | 358/494 |
| 2005/0286094 A1 | * | 12/2005 | Han et al. | 358/474 |
| 2007/0201918 A1 | * | 8/2007 | Shoda et al. | 399/376 |

* cited by examiner

*Primary Examiner* — Negussie Worku
(74) *Attorney, Agent, or Firm* — John Victor Pezdek

(57) ABSTRACT

A scanner for demarcating each media sheet of a multiplicity of media sheets and a method thereof. The scanner includes a platen, a scanlid, an illuminating mechanism and a scanhead. The platen accommodates the multiplicity of media sheets. The scanlid is pivotally coupled to the platen and provides a background for scanning the multiplicity of media sheets. The illuminating mechanism is coupled to the scanlid and is activated for illuminating the background. The scanhead scans the multiplicity of media sheets. A single background image of the multiplicity of media sheets is captured by activating the illuminating mechanism during scanning. A single foreground image of the multiplicity of media sheets is captured by deactivating the illuminating mechanism during scanning. Edges of each media sheet are detected in the background image, and are combined with the foreground image to extract content thereof.

17 Claims, 5 Drawing Sheets

SYSTEM AND METHOD FOR DEMARCATING MEDIA SHEETS DURING A SCAN OPERATION

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to scanners, and, more particularly, to a scanner for scanning multiple media sheets simultaneously, and demarcating each scanned media sheet of the scanned media sheets.

2. Description of the Related Art

A scanner, typically, is utilized for creating a digital replica of content, such as text, graphics, images, and the like, displayed on a media sheet, such as a sheet of paper. However, creating the digital replica of the content displayed on each media sheet of multiple media sheets may be a time-consuming and a cumbersome activity, especially for business entities, such as organizations. The organizations may need to simultaneously scan the multiple media sheets for replicating the content displayed on each media sheet of the multiple media sheets.

Many techniques exist for the simultaneous scanning of the multiple media sheets. One such technique for the simultaneous scanning of the multiple media sheets includes placing the multiple media sheets together on a platen of a scanner and covering the multiple media sheets with a scanlid of the scanner. The scanlid provides a background for scanning the multiple media sheets. The technique further involves recognizing a placement of each media sheet of the multiple media sheets on the platen and properly orienting each media sheet by scan software. Thereafter, an Optical Character Recognition (OCR) software reads the content displayed on each media sheet and automatically inputs the read content in a database that is included in the scanner.

However, the technique may be incapable of accurately replicating the content displayed on each media sheet of the multiple media sheets in certain situations. For example, in situations wherein the background for scanning of the multiple media sheets, i.e. a color of the scanlid matches a color of the multiple media sheets, the technique may be incapable of demarcating each media sheet of the multiple media sheets. On account of an incapability to demarcate each media sheet, the replicated content of a media sheet may merge with the replicated content of another media sheet being scanned simultaneously by the scanner. Typically, the background for scanning of the multiple media sheets is chosen to be white in color. For media sheets, such as business cards, which are generally white in color, scanning the multiple media sheets simultaneously against the white background may result in merging of edges of the media sheets, thereby precluding an accurate demarcation of each media sheet of the media sheets.

For demarcating each media sheet of the multiple media sheets, the scanlid of the scanner, nowadays, is typically configured to glow in the dark. The multiple media sheets are placed on the platen of the scanner and the scanlid is placed over the multiple media sheets for providing the background to the multiple media sheets. The scanlid glows when closed over the multiple media sheets, thereby assisting the scan software to detect the edges of each media sheet, and thus demarcate each media sheet of the multiple media sheets.

However, the scanlid configured to glow in the dark suffers from a few drawbacks. Though the glow of the scanlid enables demarcation of each media sheet of the multiple media sheets, the glow may hinder the replication of the content of a single media sheet being scanned, and as such, the scanlid may need to be reconfigured for scanning the single media sheet. Further, in case of thin media sheets, such as receipts, newspaper cuttings, and the like, the glow may pass through the thin media sheets causing undesirable effects in the replication of the content. Further, the glow of the scanlid may get undesirably charged when the scanlid is exposed to light in a well-lit room.

Accordingly, there is a need to demarcate each media sheet of multiple media sheets by a scanner. Further, there exists a need to demarcate each media sheet of multiple media sheets by a scanner and preclude configuration of a scanlid of the scanner to glow in the dark.

SUMMARY OF THE DISCLOSURE

In view of the foregoing disadvantages inherent in the prior art, the general purpose of the present disclosure is to provide a scanner and a method for demarcating each media sheet of a multiplicity of media sheets by the scanner, to include all the advantages of the prior art, and to overcome the drawbacks inherent therein.

Accordingly, in one aspect, the present disclosure provides a scanner. The scanner includes a platen, a scanlid, an illuminating mechanism and a scanhead. The platen accommodates a multiplicity of media sheets thereon. The scanlid is pivotally coupled relative to the platen and is capable of being movable between a closed position in which the scanlid substantially covers the platen and an open position in which the platen is substantially uncovered. The scanlid provides a background for scanning of the multiplicity of media sheets. The illuminating mechanism is operably coupled to the scanlid. The illuminating mechanism is capable of being activated for selectively illuminating the background for scanning of the multiplicity of media sheets. The scanhead is configured to scan the multiplicity of media sheets. Scanning of the multiplicity of media sheets by the scanhead upon activation of the illuminating mechanism captures a background image of the multiplicity of media sheets. Scanning of the multiplicity of media sheets by the scanhead upon deactivation of the illuminating mechanism captures a foreground image of the multiplicity of media sheets. Edges of each media sheet of the multiplicity of media sheets are detected based on the background image and the detected edges of each media sheet demarcate each media sheet of the multiplicity of media sheets.

Further, in another aspect, the present disclosure provides a method for demarcating each media sheet of the multiplicity of media sheets by a scanner. The method includes illuminating a background of the multiplicity of media sheets. The multiplicity of media sheets are scanned upon illumination of the background for capturing a background image of the multiplicity of media sheets. Edges of each media sheet of the multiplicity of media sheets are detected based on the background image and the detected edges of each media sheet demarcate each media sheet of the multiplicity of media sheets.

Furthermore, in yet another aspect, the present disclosure provides a computer program product embodied on a computer readable medium for demarcating each media sheet of the multiplicity of media sheets by a scanner. The computer program product includes a program module having instructions for illuminating a background of the multiplicity of media sheets. Further, the program module has instructions for scanning the multiplicity of media sheets upon illumination of the background for capturing a background image of the multiplicity of media sheets. Furthermore, the program module has instructions for detecting edges of each media sheet of the multiplicity of media sheets based on the background image. The detected edges of each media sheet demarcate each media sheet of the multiplicity of media sheets.

The background image captured by illuminating a background provides information of edges of the multiplicity of media sheets and assists in demarcating each media sheet of the multiplicity of media sheets scanned simultaneously by the scanner. Further, the illuminating mechanism configured to selectively illuminate the background of the multiplicity of media sheets, enables demarcating each media sheet of the multiplicity of media sheets scanned by the scanner and precludes the need to configure the scanlid to glow in the dark.

BRIEF DESCRIPTION OF THE DRAWINGS

The above-mentioned and other features and advantages of the present disclosure, and the manner of attaining them, will become more apparent and the present disclosure will be better understood by reference to the following description of embodiments of the present disclosure taken in conjunction with the accompanying drawings, wherein.

DETAILED DESCRIPTION

Figure 1:
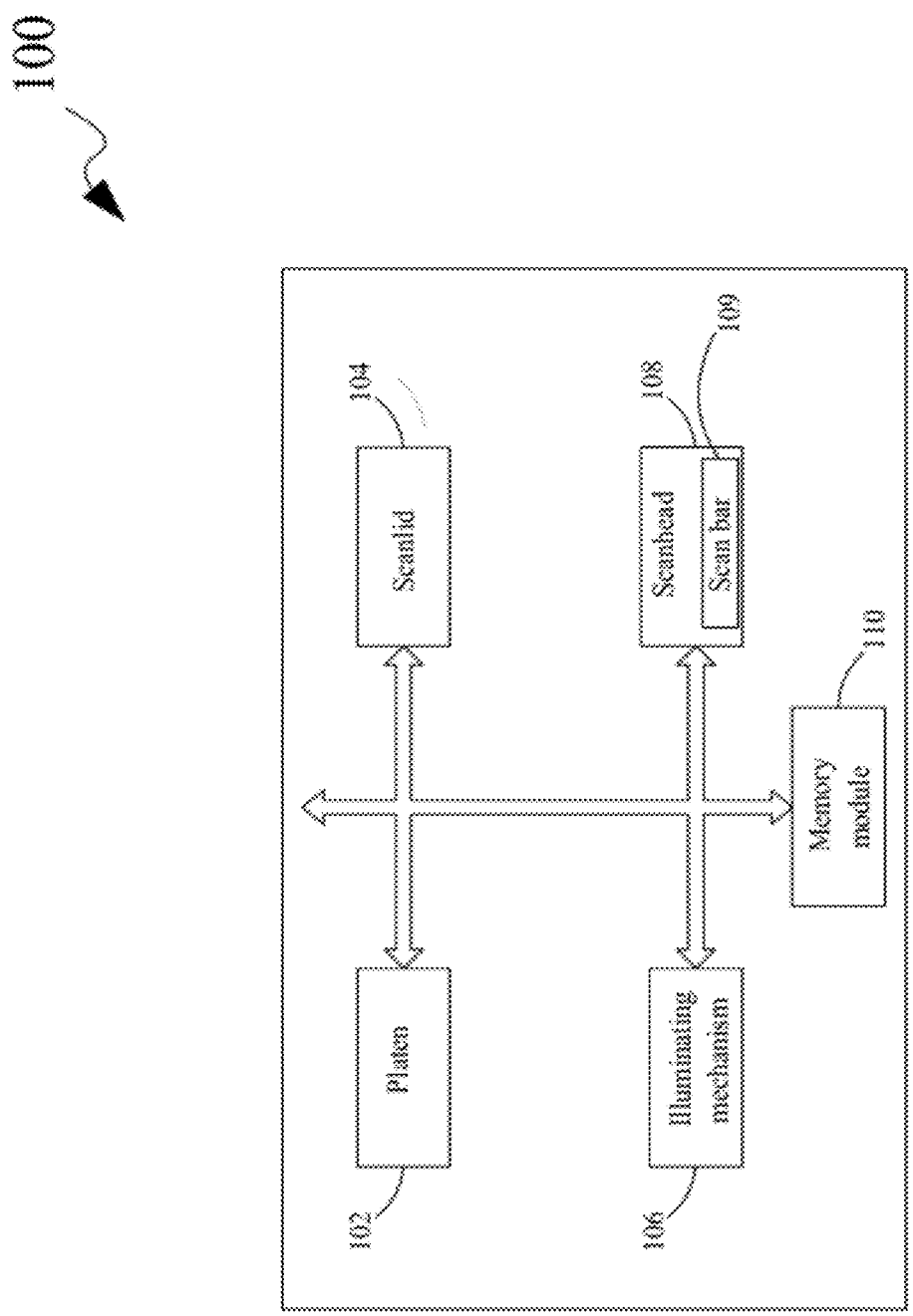
FIG. 1 is a block diagram of a scanner, in accordance with an embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless limited otherwise, the terms "connected," and "coupled," and variations thereof herein are used broadly and encompass direct and indirect connections and couplings. In addition, the terms "connected" and "coupled" and variations thereof are not restricted to physical or mechanical connections or couplings.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the present disclosure may be implemented in software. As such, it should be noted that a plurality of hardware and software-based devices, as well as a plurality of different structural components may be utilized to implement the present disclosure.

The present disclosure provides a scanner for demarcating edges of each media sheet of a multiplicity of media sheets. The scanner includes a platen, a scanlid, an illuminating mechanism and a scanhead. The platen accommodates the multiplicity of media sheets thereon. The scanlid is pivotally coupled relative to the platen and is capable of being movable between a closed position in which the scanlid substantially covers the platen and an open position in which the platen is substantially uncovered. The scanlid provides a background for scanning of the multiplicity of media sheets. The illuminating mechanism is operably coupled to the scanlid. The illuminating mechanism is capable of being activated for selectively illuminating the background for scanning of the multiplicity of media sheets. The scanhead is configured to scan the multiplicity of media sheets. Scanning of the multiplicity of media sheets by the scanhead upon activation of the illuminating mechanism captures a background image of the multiplicity of media sheets. Scanning of the multiplicity of media sheets by the scanhead upon deactivation of the illuminating mechanism captures a foreground image of the multiplicity of media sheets. Edges of each media sheet of the multiplicity of media sheets are detected based on the background image and the detected edges of each media sheet demarcate each media sheet of the multiplicity of media sheets.

Referring now to the drawings and particularly to FIG. 1, there is shown a block diagram of a scanner 100, in accordance with an embodiment of the present disclosure. Scanner 100 includes a platen 102, a scanlid 104, an illuminating mechanism 106, a scanhead 108 and a memory module 110. Scanhead 108 includes a light source, such as scan bar 109 having red, green and blue LEDs, that is illuminated when scanning the media sheet for its content.

Platen 102 is capable of accommodating the multiplicity of media sheets (see FIG. 2) thereon. Scanlid 104 is pivotally coupled relative to platen 102 and is capable of being movable between a closed position (not shown) in which scanlid 104 substantially covers platen 102 and an open position (not shown) in which platen 102 is substantially uncovered by scanlid 104. Scanlid 104 provides a background for scanning of the multiplicity of media sheets accommodated on platen 102. Illuminating mechanism 106 is operably coupled to scanlid 104. Illuminating mechanism 106 is capable of being activated for selectively illuminating the background for scanning of the multiplicity of media sheets. Scanhead 108 is configured to scan the multiplicity of media sheets.

For the purpose of description of the present disclosure, a media sheet of the multiplicity of media sheets may be defined as a sheet of paper that includes content. For example the media sheet, such as a business card, may include the content, such as contact information of a person. The multiplicity of media sheets may be simultaneously accommodated on platen 102. Platen 102 may be substantially covered by scanlid 104 when scanlid 104 is in the closed position. Scanlid 104, in the closed position, is configured to provide the background for scanning of the multiplicity of media sheets when the multiplicity of media sheets is accommodated on platen 102.

Scanlid 104 is operably coupled to illumination mechanism 106. Illuminating mechanism 106 is capable of being selectively activated for illuminating the background of the multiplicity of media sheets accommodated on platen 102. Illuminating mechanism 106 may be activated by at least one of a scanner default setting, a user input and one or more properties of each media sheet of the multiplicity of media sheets. The scanner default setting may refer to a preset configuration of scanner 100. Alternatively, illuminating mechanism 106 may be activated by the user input, such as a click of a mouse, a stroke on a keyboard, a press of a switch, and the like, provided by a user of scanner 100. The user input may be provided to scanner 100 through an input module (not shown), such as a keyboard, a touch_screen, and the like. The input module may be included in scanner 100, or alternatively, the input module may be included in a processing system, such as a computer system, connected to scanner 100.

Illuminating mechanism 106 may also be activated automatically by the one or more properties of each media sheet. A property of the one or more properties of each media sheet may be one of a thickness of each media sheet and a color thereof. In an embodiment of the present disclosure, scanner 100 may include a sensing device (not shown) that may be capable of detecting the one or more properties of each of the multiplicity of media sheets. The sensing device may automatically detect the one or more properties of the multiplicity of media sheets, and activate illuminating mechanism 106. For example, the sensing device may automatically detect thicknesses of each of two media sheets accommodated on platen 102, and activate illuminating mechanism 106.

Scanhead 108 is configured to scan the multiplicity of media sheets placed on platen 102 and covered by scanlid 104. A scan of the multiplicity of media sheets by scanhead 108 upon activation of illuminating mechanism 106 captures a background image of the multiplicity of media sheets. A scan of the multiplicity of media sheets by scanhead 108 upon deactivation of illuminating mechanism 106 captures a foreground image of the multiplicity of media sheets. It will be apparent to a person skilled in the art that scanhead 108 may utilize a scan bar 109 coupled to platen 102 for scanning the multiplicity of media sheets. The scan bar 109 may execute an illumination sequence of red Light Emitting Diodes (LEDs) blue LEDs and green LEDs, repeatedly, for scanning of the multiplicity of media sheets.

For the purpose of description of this disclosure, the background image of the multiplicity of media sheets refers to an image of the multiplicity of media sheets, scanned with the background of the multiplicity of media sheets illuminated. Illumination of the background provided by scanlid 104 prior to scanning of the multiplicity of media sheets highlights edges of the multiplicity of media sheets. The background image includes information of the edges of the multiplicity of media sheets. The scan operation for capturing the background image may or may not be performed with illumination of light sources disposed on the scan bar 109 of scanhead 108.

The foreground image of the multiplicity of media sheets refers to a conventionally scanned image of the multiplicity of media sheets. The foreground image of the multiplicity of media sheets is captured precluding illumination of the background. Further, the foreground image includes information of the content of the multiplicity of media sheets.

In an embodiment of the present disclosure, a default scan resolution for scanhead 108 is 300 dots per inch (dpi). In an alternative embodiment of the present disclosure, scanhead 108 may scan at a scan resolution of 600 dpi by discarding every alternate line of the multiplicity of media sheets, as opposed to a default scan resolution of 300 dpi. A scan of the multiplicity of media sheets with the background illuminated may be performed on alternate discarded lines for capturing a portion of the background image. Similarly, the foreground image may be captured in portions, thereby capturing the background image and the foreground image simultaneously.

Memory module 110 may be configured to store the background image and the foreground image captured by scanhead 108. Specifically, memory module 110 may be configured to store the information of the edges of each media sheet and the information of the content of each media sheet. Each media sheet of the multiplicity of media sheets may be separately stored in memory module 110 based on the edges detected from the background image.

In an embodiment of the present disclosure, the background image captured by scanhead 108 may be amplified by stretching a dynamic range of the background image. A technique for stretching the dynamic range of the background image may be a histogram stretch which amplifies a dynamic difference between the multiplicity of media sheets and the background provided by scanlid 104. Thereafter, the amplified background image may be run through an industry standard edge detection algorithm, such as Sobel operator, Prewitt operator, Canny operator, and the like.

After running the background image through the edge detection algorithm, the information of the edges of each media sheet may be passed to an image segmentation algorithm that extracts the information of the content of each media sheet from the foreground image. Thereafter, a deskew algorithm may be applied to the information of the content of each media sheet extracted from the foreground image. It will be apparent to a person skilled in the art that the deskew algorithm assists in removing skew defects present in the information of the content of each media sheet extracted from the foreground image. Thereafter, an Optical Character Recognition (OCR) software may be capable of reading the content of each media sheet that has been extracted based on the information of the edges detected in the background image. Further, the OCR software may store the content of each media sheet separately in memory module 110.

It is understood that each component of scanner 100, such as platen 102, scanlid 104, illuminating mechanism 106, scanhead 108, memory module 110, the input module, the sensing device and the scan bar 109 may be implemented as a hardware module, a firmware module, or any combination thereof. Further, it is understood that scanner 100 may be coupled with the processing system, such as the computer system, for viewing demarcated media sheets of the multiplicity of media sheets. Further, scanner 100 may include requisite electrical or mechanical connections for communicably coupling the various components of scanner 100, such as platen 102, scanlid 104, illuminating mechanism 106, scanhead 108, memory module 110, the input module, the sensing device and the scan bar 109. Furthermore, it is understood that scanner 100 may include typical components (not shown), such as a battery unit and a microcontroller for performing typical functions of scanner 100. Demarcation of the edges of each media sheet by a scanner is explained in further detail in embodiments described in conjunction with FIGS. 2, 3 and 4.

Figure 2:
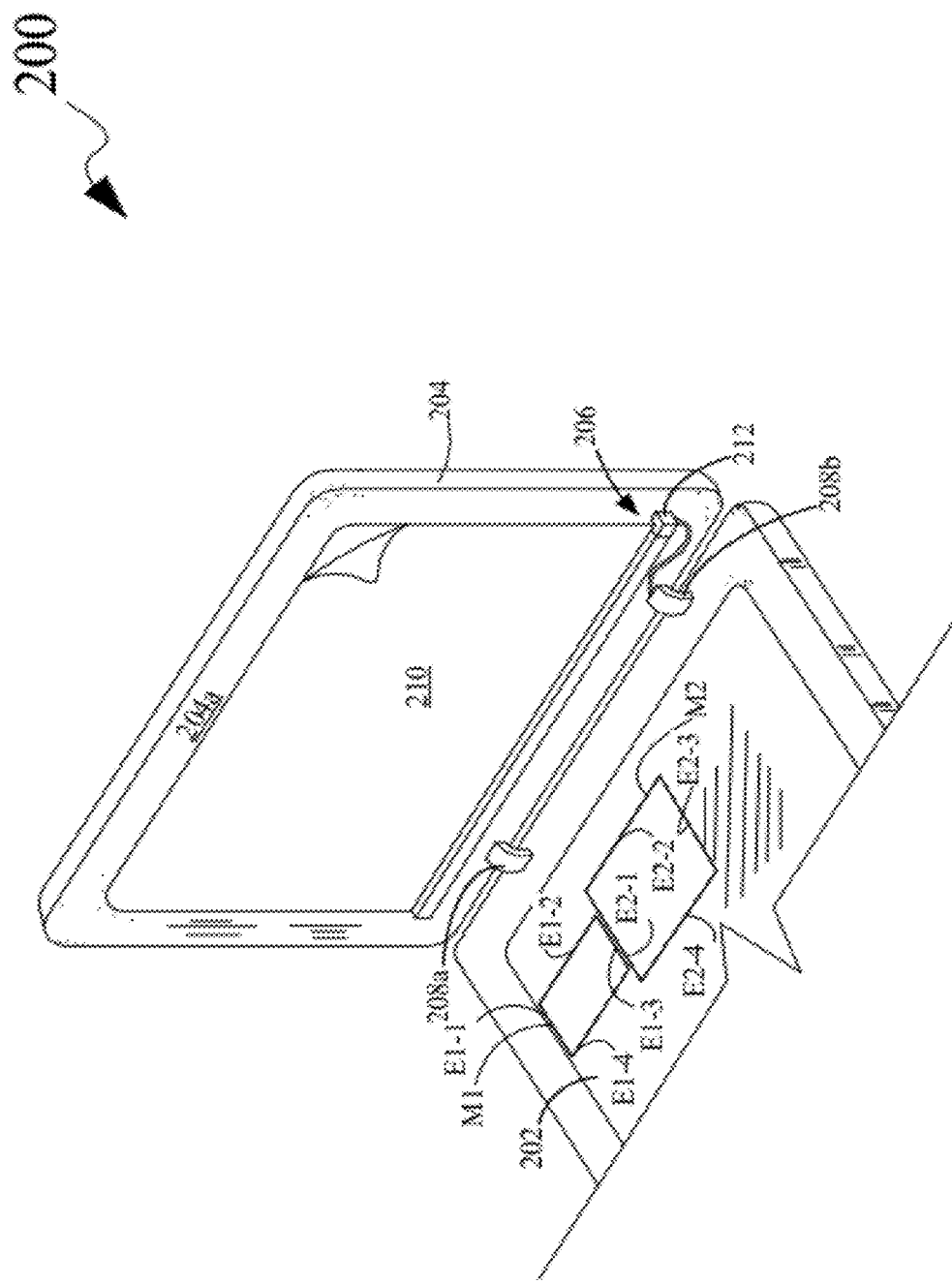
FIG. 2 is a schematic diagram depicting a scanner configured with an illuminating mechanism that includes a light guide film and a Light Emitting Diode (LED), in accordance with another embodiment of the present disclosure.

FIG. 2 is a schematic diagram depicting a scanner 200, in accordance with another embodiment of the present disclosure. Scanner 200 depicts a platen 202, a scanlid 204 and an illuminating mechanism 206. Scanner 200 also includes a scanhead, such as scanhead 108, a memory module, such as memory module 110, and other components, such as the input module and the sensing device explained in conjunction with FIG. 1. The scanhead, the memory module, and the other components explained in FIG. 1 have not been shown in FIG. 2 for the sake of brevity. Two media sheets M1, M2, representative of a multiplicity of media sheets, are shown on the platen 202. Media sheets M1, M2 are shown as being single-sided and have the content that will be scanned only on the surface that is face down on the platen 202.

Platen 202 of scanner 200 is capable of accommodating a multiplicity of media sheets thereon. Two example media sheets M1, M2 are shown on the platen 202. For example, media sheet M1 may be a business card while media sheet M2 may be an a receipt. Media sheet M1 has edges E1-1 - E1-4 (collectively edges E1) while media sheet M2 has edges E2-1 - E2-4 (collectively edges E2). As illustrated, media sheets M1, M2 are shown spaced away from the border of platen 202 and from one another. However, media sheets M1, M2 may more typically be placed abutting either the border of platen 202, one another, or abutting both the border of platen 202 and one another. Edges E1 and E2 would be detected as previously described. Scanlid 204 is pivotally coupled relative to platen 202 through a hinge 208a and a hinge 208b (hereinafter collectively referred to as 'hinges 208'). Scanlid 204 is movable about hinges 208 for assuming an open position and a closed position. Specifically, scanlid 204 is movable between an open position (as depicted in FIG. 2) in which platen 202 is substantially uncovered and a closed position (not shown) in which scanlid 204 substantially covers platen 202 and media sheets M1, M2. In the closed position, scanlid 204 provides a background for scanning the multiplicity of media sheets, M1 M2.

Scanlid 204 includes a front surface 204a and a back surface (not shown) opposite to front surface 204a. As depicted in FIG. 2, illuminating mechanism 206 is disposed on front surface 204a of scanlid 204 and is capable of being pivotally moved about hinges 208, along with scanlid 204. As depicted in FIG. 2, illuminating mechanism 206 includes a light guide film 210 and one or more Light Emitting Diodes (LEDs), such as an LED 212. LED 212 is coupled to light guide film 210 as depicted in FIG. 2, and is capable of emitting light. Light guide film 210 is composed of a rough surface that enables refraction of the light emitted by LED 212, thereby illuminating light guide film 210. Light guide film 210 of illuminating mechanism 206 forms the background for scanning the multiplicity of media sheets when scanlid 204 is in the closed position.

When scanlid 204 is in the closed position over platen 202 on which the multiplicity of media sheets are accommodated, a background image of the multiplicity of media sheets may be captured by illuminating the background during scanning of the multiplicity of media sheets. Further, a foreground image may be captured by conventionally scanning the multiplicity of media sheets, precluding illumination of the background. The background image and the foreground image may be scanned by the scanhead 108, as explained in FIG. 1. Further, the background image and the foreground image may be stored in the memory module 110. As explained previously, the background image may include information of edges of the multiplicity of media sheets. Further, the foreground image of the multiplicity of media sheets may include information of content of the multiplicity of media sheets. The information of the edges of each media sheet of the multiplicity of media sheets assists in demarcating each media sheet from the other media sheets in the multiplicity of media sheets that are scanned, as explained in connection with FIG. 1. Further, the information of the edges of each media sheet from the background image superimposed on the content information of each media sheet from the foreground image assists in separately storing the content information of each media sheet in a database (not shown) present in the memory module 110. Another illuminating mechanism for illuminating the background of the multiplicity of media sheets is explained in conjunction with FIG. 3.

Figure 3:
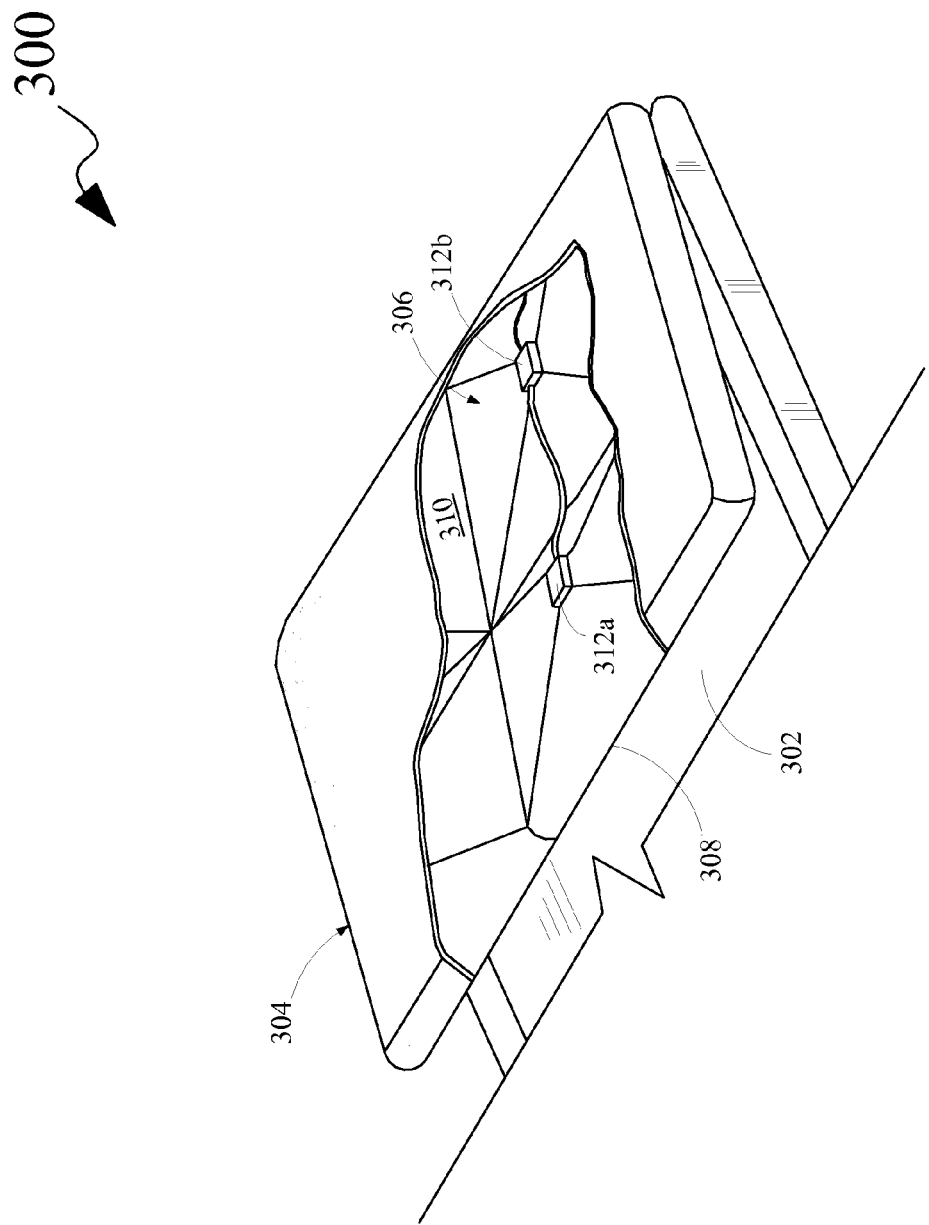
FIG. 3 is a schematic diagram depicting a scanner configured with an illuminating mechanism that includes one or more Light Emitting Diodes (LEDs), in accordance with yet another embodiment of the present disclosure.

FIG. 3 is a schematic diagram depicting a scanner 300, in accordance with yet another embodiment of the present disclosure. Scanner 300 is shown to include a platen 302, a scanlid 304 and an illuminating mechanism 306. Scanner 300 also includes a scanhead, such as scanhead 108, a memory module, such as memory module 110, and other components, such as the input module and the sensing device explained in conjunction with FIG. 1. The scanhead, the memory module, and the other components explained in FIG. 1 have not been shown in FIG. 3 for the sake of brevity.

The multiplicity of media sheets may be accommodated on platen 302. Scanlid 304 is pivotally coupled relative to platen 302 and is depicted to assume a position between a closed position (not shown) in which scanlid 304 substantially covers platen 302 and an open position (not shown) in which platen 302 is substantially uncovered by scanlid 304. Scanlid 304 includes translucent screen 308 having a first surface 310 and a second surface (not shown) opposite to first surface 310. In the closed position, scanlid 304 provides a background for scanning the multiplicity of media sheets. More specifically, the second surface of translucent screen 308 faces the multiplicity of media sheets in the closed position of scanlid 304, and provides the background to the multiplicity of media sheets.

Illuminating mechanism 306 is disposed on first surface 310 of translucent screen 308 of scanlid 304, as depicted in FIG. 3. Illuminating mechanism 306 includes one or more LEDs, such as an LED 312a and an LED 312b (hereinafter collectively referred to as 'one or more LEDs 312'). One or more LEDs 312 are disposed on first surface 310 of translucent screen 308. One or more LEDs 312 are capable of generating light and providing illumination in a direction of translucent screen 308. Due to an inherent property of translucent screen 308, the illumination provided by one or more LEDs 312 is capable of lighting the second surface of translucent screen 308. One or more LEDs 312 may be capable of being activated based on at least one of scanner default setting, a user input and one or more properties of each media sheet of the multiplicity of media sheets, as explained in connection with FIG. 1.

It is understood that various combinations of the embodiments as explained in FIGS. 2 and 3 may also exist. For instance, scanlid 204 of scanner 200 may include a translucent screen, such as translucent screen 308, and illuminating mechanism 206 of scanner 200 may be disposed on a first surface of the translucent screen of scanlid 204.

The scanhead of scanner 300 captures the background image and the foreground image of the multiplicity of media sheets, as explained in connection with FIG. 1. Further, each media sheet of the multiplicity of media sheets is demarcated based on the foreground image and the background image, as previously explained. Another illuminating mechanism for illuminating the background of the multiplicity of media sheets is explained in conjunction with FIG. 4.

Figure 4:
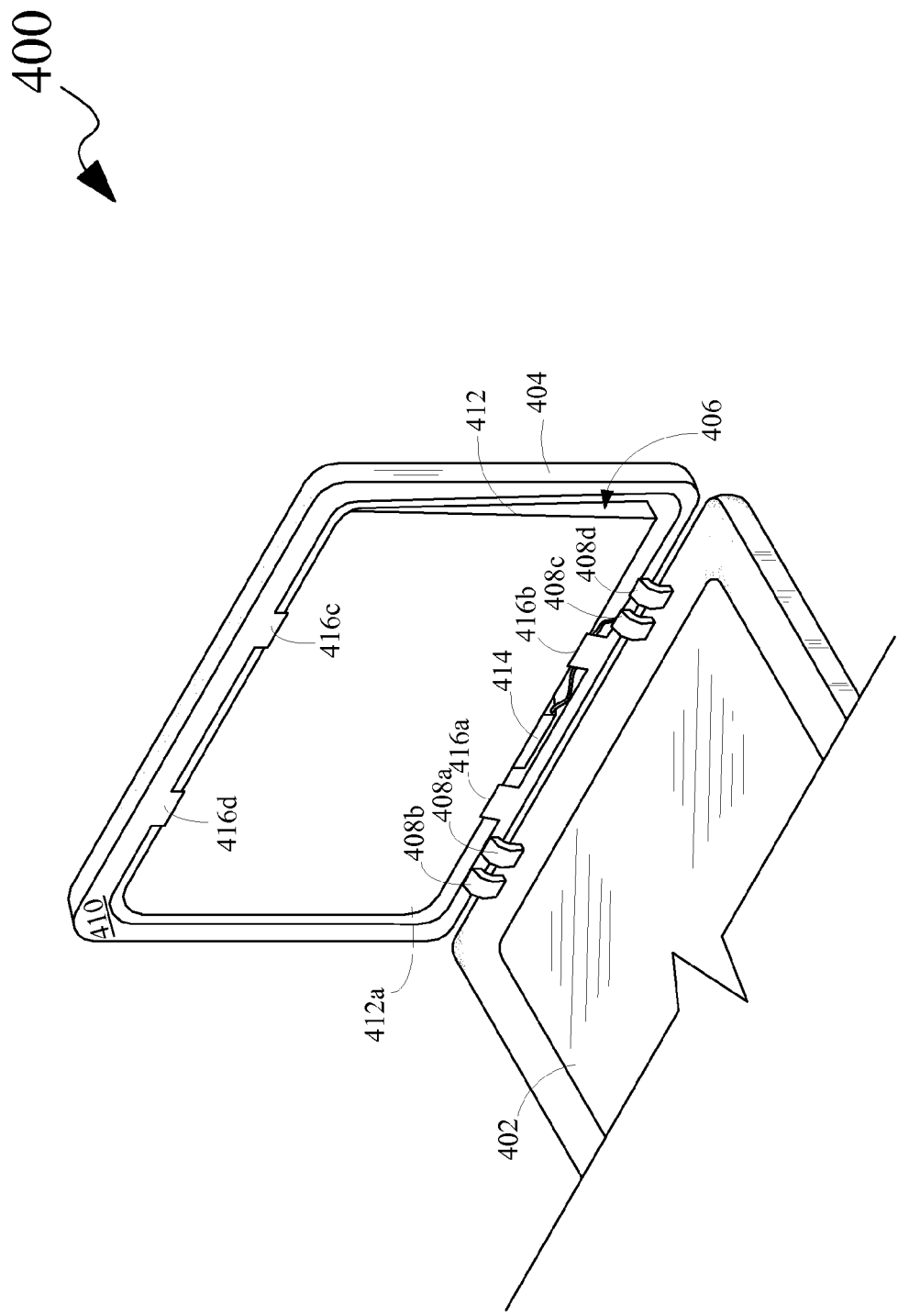
FIG. 4 is a schematic diagram depicting a scanner configured with an illuminating mechanism that includes a substantially wedge-shaped light guide and one or more LEDs, in accordance with still another embodiment of the present disclosure.

FIG. 4 is a schematic diagram depicting a scanner 400, in accordance with still another embodiment of the present disclosure. Scanner 400 is shown to include a platen 402, a scanlid 404 and an illuminating mechanism 406. Further, scanner 400 also includes a scanhead (not shown) a memory module (not shown), and other components, such as the input module and the sensing device explained in conjunction with FIG. 1. The scanhead, the memory module, and the other components explained in FIG. 1 have not been shown in FIG. 4 for the sake of brevity.

Platen 402 is configured to accommodate the multiplicity of media sheets thereon. Scanlid 404 is coupled relative to platen 402 through hinges, such as a hinge 408a, a hinge 408b, a hinge 408c and a hinge 408d (hereinafter collectively referred to as 'hinges 408'). Scanlid 404 is capable of a pivotal motion relative to platen 402 about hinges 408. Scanlid 404 may move between an open position (as depicted) in which platen 402 is uncovered by scanlid 404 and a closed position (not shown) in which platen 402 is substantially covered by scanlid 404. In the closed position, scanlid 404 provides a background for scanning of the multiplicity of media sheets.

Scanlid 404 includes a front surface 410 and a back surface (not shown). Illuminating mechanism 406 is disposed on front surface 410 of scanlid 404. Illuminating mechanism 406 includes a substantially wedge-shaped light guide 412 and one or more LEDs, such as LED 414. Wedge-shaped light guide 412 is disposed on scanlid 404 and forms the background for scanning the multiplicity of media sheets. Wedge-shaped light guide 412 is coupled to scanlid 404 by fasteners, such as a fastener 416a, a fastener 416b, a fastener 416c and a fastener 416d (herein after collectively referred to as 'fasteners 416'). It is understood that scanlid 404 may be configured to include fasteners 416. Further, other coupling mechanisms, such as a hook and loop fasteners, and the like, may also be utilized for disposing wedge-shaped light guide 412 on scanlid 404.

LED 414 is disposed on a central portion of a lateral edge 412a of wedge-shaped light guide 412, as shown in FIG. 4. LED 414 is capable of being activated to generate light for illuminating wedge-shaped light guide 412. Wedge-shaped light guide 412 is composed of a translucent material in order to spread the light generated by LED 414. In the closed position of scanlid 404, wedge-shaped light guide 412 provides the background for scanning the one or media sheets. With scanlid 404 in the closed position, a background image of the multiplicity of media sheets is captured by illuminating the background. A foreground image of the multiplicity of media sheets is captured when illumination of the background is deactivated. Illumination of the background assists in detecting edges of each media sheet of the multiplicity of media sheets. Further, each media sheet of the multiplicity of media sheets is demarcated based on the background image and the foreground image, as explained in conjunction with FIGS. 1, 2 and 3.

It is understood that various combinations of the embodiments explained in conjunction with FIGS. 2, 3 and 4 may also be utilized for demarcating each media sheet. A method for demarcating each media sheet of the multiplicity of media sheets is explained in detail in FIG. 5.

Figure 5:
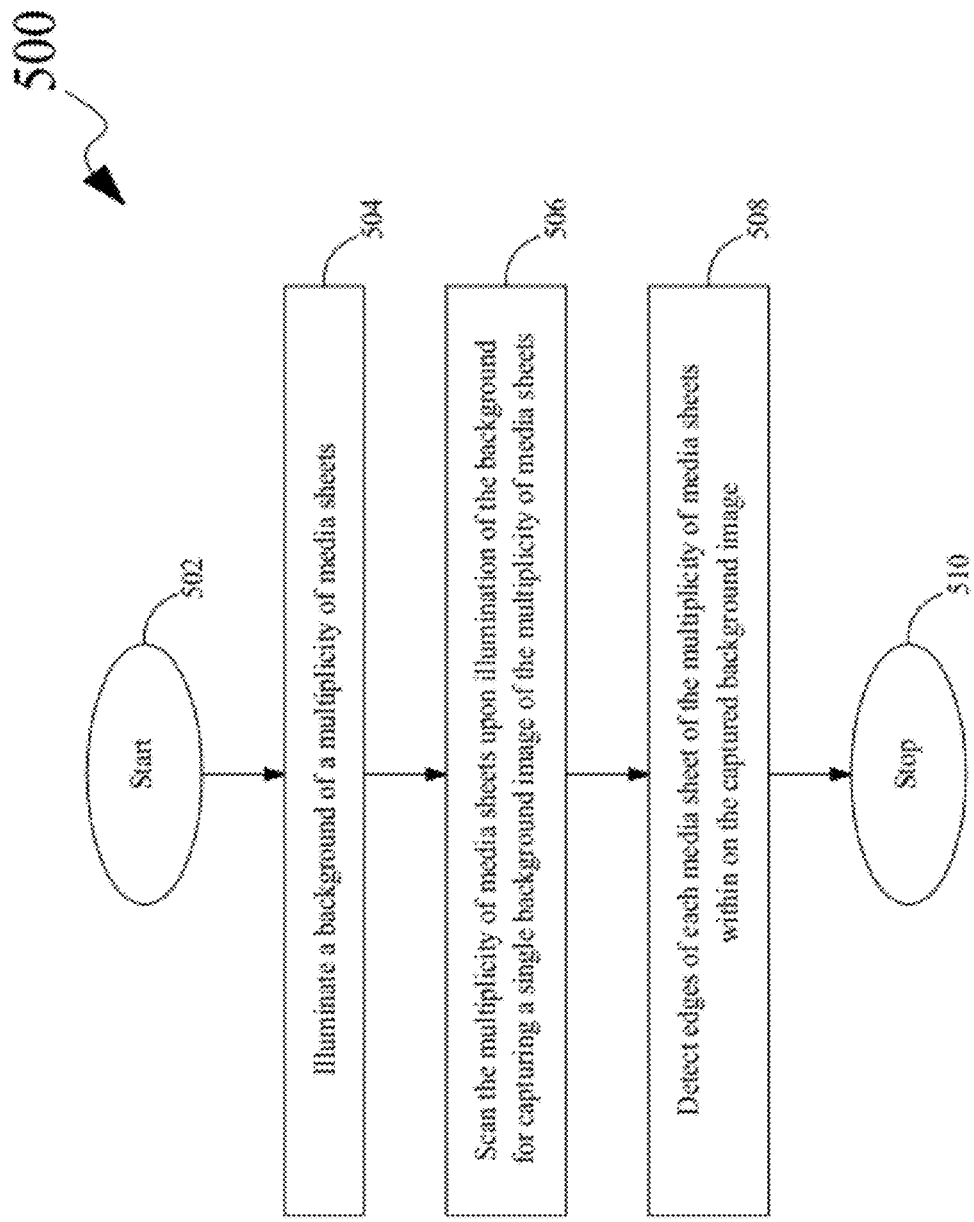
FIG. 5 is a flow diagram depicting a method for demarcating each media sheet of a multiplicity of media sheets by a scanner, in accordance with an embodiment of the present disclosure.

FIG. 5 is a flow diagram depicting a method 500 for demarcating each media sheet of the multiplicity of media sheets by a scanner, such as scanner 100, scanner 200, scanner 300 and scanner 400, in accordance with an embodiment of the present disclosure.

Method 500 begins at 502. At 504, a background of the multiplicity of media sheets is illuminated. At 506, the multiplicity of media sheets are scanned upon illumination of the background for capturing a background image of the multiplicity of media sheets. At 508, edges of each media sheet of the multiplicity of media sheets are detected based on the background image. At 510, method 500 ends.

At 502, one or more media sheets may be placed on a platen of the scanner, such as platen 202 of scanner 200. A scanlid of the scanner, such as scanlid 204 of scanner 200, may then be placed in a closed position over the platen. The scanlid substantially covers the platen in the closed position. The scanlid provides a background to the one or more media sheets in the closed position.

At 504, the background of the multiplicity of media sheets is illuminated. Further, at 506, the multiplicity of media sheets are scanned upon illumination of the background for capturing a background image of the multiplicity of media sheets. The background image of the multiplicity of media sheets refers to an image that is captured when the multiplicity of media sheets are scanned with the background illuminated. The background image includes information of the edges of the multiplicity of media sheets. Scanning the media sheets to capture the background image mayor may not be performed by illuminating light sources in the scan bar of scanhead 108.

In an embodiment of the present disclosure, the background may be illuminated based on activation of an illuminating mechanism, such as illuminating mechanism 206 of scanner 200. The illuminating mechanism may be activated based on at least one of scanner default setting, a user input and one or more properties of each media sheet of the multiplicity of media sheets. A property of the one or more properties of each media sheet may be one of a thickness of each media sheet and a color thereof. The illuminating mechanism may be activated as explained in conjunction with FIG. 1.

At 508, edges of each media sheet of the multiplicity of media sheets are detected based on the background image captured from the scanned multiplicity of media sheets. Illumination of the background prior to scanning of the multiplicity of media sheets highlights edges of the multiplicity of media sheets, thereby substantially distinguishing between each media sheet of the multiplicity of media sheets captured in the background image.

Thereafter, the multiplicity of media sheets accommodated on the platen of the scanner are scanned for capturing a foreground image of the multiplicity of media sheets. The foreground image is captured precluding illumination of the background of the multiplicity of media sheets. The foreground image of the multiplicity of media sheets refers to a conventionally scanned image of the multiplicity of media sheets. A conventional scan by the scanner involves execution of an illumination sequence of red LEDs, blue LEDs and green LEDs by a scan bar of the scanner. The illumination sequence is repeated in a cycle for capturing the foreground image of the multiplicity of media sheets. The foreground image includes information of content of the multiplicity of media sheets.

In an embodiment of the present disclosure, the foreground image is captured prior to the background image. Specifically, the background of the multiplicity of media sheets may be illuminated, and thereafter the multiplicity of media sheets may be scanned for capturing the background image.

In another embodiment of the present disclosure, the multiplicity of media sheets may be scanned for capturing the background image and the foreground image simultaneously.

More specifically, the scan bar executes the illumination sequence of red LEDs, blue LEDs and green LEDs for capturing a portion of the foreground image. Thereafter, the background is illuminated and the scanhead of the scanner scans the multiplicity of media sheets for capturing a portion of the background image. The cyclical order causes a portion of the foreground image to be captured, followed by capturing of a portion of the background image in an alternating manner. The cyclical order of capturing portions of the foreground image and the background image is repeated till the multiplicity of media sheets are completely scanned.

Thereafter, the foreground image and the background image may be stored in a memory module, such as memory module 110 explained in conjunction with FIG. 1. Each media sheet of the multiplicity of media sheets may be separately stored in memory module 110 based on the edges detected from the background image.

The edges of each media sheet of the multiplicity of media sheets may be detected by utilizing edge detection algorithms as explained in conjunction with FIG. 1. Further, an image segmentation algorithm may extract the information of the content of each media sheet from the foreground image. It is understood that method 500 may utilize any of the illuminating mechanisms described in FIGS. 2, 3 and 4.

Demarcating edges of each media sheet of the multiplicity of media sheets by a scanner, such as scanner 100, scanner 200, scanner 300 and scanner 400 and a method, such as method 500 is beneficial for separating each media sheet of the multiplicity of media sheets that are scanned simultaneously. Specifically, content of each media sheet can be separated and accessed by utilizing the scanner disclosed herein. The multiplicity of media sheets are separated by illuminating a background of the multiplicity of media sheets. The background is illuminated by utilizing an illuminating mechanism, such as illuminating mechanism 106, illuminating mechanism 206, illuminating mechanism 306 and illuminating mechanism 406, Further, the illuminating mechanism utilizes substantially less intensity of light for illuminating the background of the multiplicity of media sheets, thereby precluding a reflection of light onto replicated content while scanning thin media sheets, such as bill receipts. Furthermore, the illuminating mechanism, such as illuminating mechanism 206 utilizing light guide film 210, requires a single Light Emitting Diode (LED) for illuminating the background, thereby enabling cost effective implementation. Still further, edge detection algorithms utilized for obtaining information of the edges of each media sheet are simple to implement in Application-Specific Integrated Circuits (ASICs) of existing scanners. For instance, a 3*3 (or greater) mask may be run on the background image, enabling on-the-fly detection of the edges of each media sheet. Further, the edge detection algorithms as explained above are immune to factors, such as the content of each media sheet or color of each media sheet, thereby adding robustness to the algorithms.

As described above, the embodiments of the present disclosure may be embodied in the form of a computer program product for demarcating each media sheet of the multiplicity of media sheets by a scanner, such as scanner 100, scanner 200, scanner 300 and scanner 400. Embodiments of the present disclosure may also be at least partly embodied in the form of program module containing instructions embodied in tangible media, such as floppy diskettes, CD-ROMs, hard drives, or any other computer- readable storage medium, wherein, when the program module is loaded into and executed by a scanner, the scanner becomes an apparatus for practicing the present disclosure. The program module includes instructions for illuminating a background of the multiplicity of media sheets. Further, the program module includes instructions for scanning the multiplicity of media sheets upon illumination of the background for capturing a background image of the multiplicity of media sheets. Still further, the program module includes instructions for detecting edges of each media sheet of the multiplicity of media sheets based on the background image. The detected edges of each media sheet demarcate each media sheet of the multiplicity of media sheets.

The program module also includes instructions for scanning the multiplicity of media sheets precluding illumination of the background for capturing a foreground image of the multiplicity of media sheets. Further, the program module includes instructions for storing the foreground image and the background image.

It is understood that the present disclosure as described above, may be embodied in the form of computer program code, for example, whether stored in a storage medium, loaded into and/or executed by a scanner, or transmitted over some transmission medium, such as over electrical wiring or cabling, through fiber optics, or via electromagnetic radiation, wherein, when the computer program code is loaded into and executed by a scanner, the scanner becomes an apparatus for practicing the present disclosure. When implemented on a general-purpose microprocessor, the computer program code segments configure the microprocessor to create specific logic circuits.

The foregoing description of several methods and an embodiment of the present disclosure have been presented for purposes of illustration. It is not intended to be exhaustive or to limit the present disclosure to the precise steps and/or forms disclosed, and obviously many modifications and variations are possible in light of the above description. It is intended that the scope of the present disclosure be defined by the claims appended hereto.

What is claimed is:

1. A scanner, the scanner comprising:
   a platen for accommodating a multiplicity of media sheets thereon;
   a scanlid pivotally coupled relative to the platen and movable between a closed position in which the scanlid substantially covers the platen and an open position in which the platen is substantially uncovered, the scanlid providing a background for scanning of the multiplicity of media sheets;
   an illuminating mechanism operably coupled to the scanlid, the illuminating mechanism being selectively activated for selectively illuminating the background for scanning of the multiplicity of media sheets;
   a scanhead for scanning the multiplicity of media sheets; and
   a controller communicatively coupled to the illuminating mechanism for:
      scanning the multiplicity of media sheets by the scanhead and upon activation of the illuminating mechanism capturing a single background image of the scanned multiplicity of media sheets;
      scanning the multiplicity of media sheets by the scanhead upon deactivation of the illuminating mechanism and capturing a single foreground image containing content of each individual media sheet of the multiplicity of media sheets;
      performing an edge detection algorithm on the captured background image of the scanned multiplicity of media sheets to detect edges of each individual media sheet within the captured background image of the scanned multiplicity of media sheets; and performing an image segmentation algorithm to extract the content of each individual media sheet in the captured foreground image by superimposing the detected edges for each individual media sheet on the captured foreground image.

2. The scanner of claim 1 wherein the illuminating mechanism is activated by at least one of a scanner default setting, a user input and one or more properties of each media sheet.

3. The scanner of claim 2 wherein a property of the one or more properties of each media sheet is at least one of a thickness of each media sheet and a color thereof.

4. The scanner of claim 1 further comprising a memory module configured to store the foreground image comprising information of content of each media sheet, and the background image comprising information of the edges of each media sheet.

5. The scanner of claim 1 wherein the illuminating mechanism comprises one or more Light Emitting Diodes (LEDs).

6. The scanner of claim 1 wherein the illuminating mechanism comprises a light guide film and one or more Light Emitting Diodes (LEDs), the light guide film being disposed on the scanlid and forming the background for scanning of the multiplicity of media sheets, the one or more LEDs coupled to the light guide film for illuminating the light guide film.

7. The scanner of claim 1 wherein the scanlid comprises a substantially translucent screen.

8. The scanner of claim 7 wherein the illuminating mechanism is disposed on a first surface of the translucent screen of the scanlid, the first surface opposite to a second surface of the translucent screen, wherein the second surface faces the multiplicity of media sheets when the scanlid is in the closed position.

9. The scanner of claim 1 wherein the illuminating mechanism comprises a substantially wedge-shaped light guide and one or more LEDs, the wedge-shaped light guide disposed on the scanlid and forming the background for scanning of the multiplicity of media sheets, and the one or more LEDs disposed on a lateral edge of the wedge-shaped light guide for illuminating the wedge-shaped light guide.

10. A method for demarcating each media sheet of a multiplicity of media sheets scanned by a scanner, the method comprising:

illuminating a background of the multiplicity of media sheets;

scanning the multiplicity of media sheets upon illumination of the background for capturing a single background image of the scanned multiplicity of media sheets;

scanning the multiplicity of media sheets precluding illumination of the background for capturing a single foreground image of the scanned multiplicity of media sheets;

performing an edge detection algorithm on the captured background image to detect edges of each individual media sheet within the captured background image of the scanned multiplicity of media sheets; and performing an image segmentation algorithm to extract the content of each individual media sheet in the captured foreground image by superimposing the detected edges for each individual media sheet on the captured foreground image.

11. The method of claim 10 further comprising storing the foreground image and the background image.

12. The method of claim 10 wherein the background image is captured prior to the foreground image.

13. The method of claim 10 wherein the foreground image is captured prior to the background image.

14. The method of claim 10 wherein the background is illuminated based on at least one of a scanner default setting, a user input and one or more properties of each media sheet.

15. The method of claim 14 wherein a property of the one or more properties of each media sheet is one of a thickness of each media sheet and a color thereof.

16. A non-transitory computer readable medium encoded with a computer executable instruction for demarcating each media sheet in a multiplicity of media sheets placed on a scanner, the computer executable instruction performing the following steps of:

illuminating a background of the multiplicity of media sheets;

scanning the multiplicity of media sheets upon illumination of the background for capturing a single background image of the scanned multiplicity of media sheets;

scanning the multiplicity of media sheets precluding illumination of the background for capturing a single foreground image of the scanned multiplicity of media sheets;

performing an edge detection algorithm on the captured background image to detect edges of each individual media sheet within the background image the scanned multiplicity of media sheets; and performing an image segmentation algorithm to extract the content of each individual media sheet in the captured foreground image by superimposing the detected edges for each individual media sheet on the captured foreground image.

17. The computer readable medium encoded with the executable instruction of claim 16 further comprising instructions for storing the foreground image and the background image.

* * * * *